United States Patent [19]

Johnston et al.

[11] Patent Number: 5,732,189
[45] Date of Patent: Mar. 24, 1998

[54] AUDIO SIGNAL CODING WITH A SIGNAL ADAPTIVE FILTERBANK

[75] Inventors: James David Johnston, Warren, N.J.; John Peter Princen, Sunnyvale, Calif.

[73] Assignee: Lucent Technologies Inc., Murray Hill, N.J.

[21] Appl. No.: 577,350

[22] Filed: Dec. 22, 1995

[51] Int. Cl.$^6$ ..................................................... G10L 3/02
[52] U.S. Cl. ..................... 395/2.39; 395/2.38; 395/2.12
[58] Field of Search ......................... 395/2.39, 2.38, 395/2.36, 2.35, 2.33, 2.91, 2.92, 2.12, 2.2, 2.09

[56] References Cited

U.S. PATENT DOCUMENTS

| | | | |
|---|---|---|---|
| 5,285,498 | 2/1994 | Johnston | 381/2 |
| 5,479,562 | 12/1995 | Fielder et al. | 395/2.38 |
| 5,481,614 | 1/1996 | Johnston | 381/2 |
| 5,533,052 | 7/1996 | Bhaskar | 375/2.44 |
| 5,574,824 | 11/1996 | Slyh et al. | 395/2.35 |
| 5,592,584 | 1/1997 | Ferreira et al. | 395/2.12 |

OTHER PUBLICATIONS

IEEE Transactions on Signal Processing, Herley, "Exact Interpolation and Iterative Subdivision schemes", vol. 43, No. 6, pp. 1348–1359, Jun. 1995.

IEEE Transactions on Speech and Audio Processing, Paraskevas et al., "Ady\ifferential Perceptual audio coding method with reduced bitraterequirements", vol. 3, No. 6, pp. 490–503, Nov. 1995.

Circuits and Systems, 1992 IEEE International Symposium, Martin et al., "Lerner–Based Non–Uniform Filter Banks and some of their applications", vol. 2, pp. 1003–1006, May 1992.

Radar, 1994 IEEE NAtional Conference, "Adaptive space––time processing for radar receive arrays with time varying two dimensional subband decompositions", pp. 206–211, Mar. 1994.

ICASSP' 94: Acoustics, Speech & Signal Processing, Sattar et al., "A method for non–parametric waveform estimation based on filter banks", vol. 3 pages III–269 to 272, Mar. 1994.

*Primary Examiner*—Allen R. MacDonald
*Assistant Examiner*—Richemond Dorvil

[57] ABSTRACT

An audio coding technique is presented, which utilizes a time varying non-uniform filterbank in conjunction with a Perceptual Audio Coder. The non-uniform filterbank is formed from a plurality of uniform filter bank sections, and a transition filter. Each uniform filterbank section covers a portion of a predetermined frequency axis, and the transition filter is utilized to cover the remainder of the predetermined frequency axis. Aliasing terms introduced at the band edges of the transition filter are cancelled to obtain an overall transfer function for the non-uniform filterbank, which has linear phase and is approximately flat. Use of the non-uniform filterbank permits an increase in temporal resolution, which results in an improved coding technique over a wide range of frequencies.

6 Claims, 2 Drawing Sheets

1

AUDIO SIGNAL CODING WITH A SIGNAL ADAPTIVE FILTERBANK

FIELD OF THE INVENTION

The instant invention relates to audio signal coding and, more particularly, to a high quality audio signal compression technique that utilizes time varying filtering in a non-uniform filterbank.

BACKGROUND OF THE INVENTION

The goal of audio signal compression is to achieve a low bit rate in the digital representation of an input audio signal with minimum perceived loss of signal quality. The function of compression is often referred to as low bit coding, or coding for short, the technical area to which this invention is directed.

It is, of course, advantageous to seek lower bit rates in the digital representation of an audio signal. When doing so, however, it is imperative that the coding technique is designed to minimize a perceptually meaningful measure of signal distortion, rather than more traditional and more tractable criteria, such as the mean squared difference between the waveform at the input and output of the coding system.

Important to the foregoing, is the notion of distortion masking, or noise masking, whereby the distortion (or noise) that is inevitably introduced in the coding process, if properly distributed or shaped, is masked by the input signal itself. The masking occurs because of the inability of the human perceptual mechanism to distinguish two signal components, (one belonging to the signal, one belonging to the noise) in the same spectral, temporal, or spatial locality.

Ideally, the noise level at all points in the signal space is exactly at the level of just noticeable distortion. This corresponds to perfect signal quality at the lowest possible bit rate. This bit rate is a fundamental limit to which one can compress the audio signal with zero (perceived) distortion. A signal coding algorithm that is based on the criteria of minimizing the perceived errors is called a perceptual coding algorithm, and the apparatus to perform this function is called a Perceptual Audio Coder (PAC).

Such coders are well known and are described in the references set forth below, all of which are incorporated herein by reference as if fully set forth herein. The references are: "Sum-Difference Stereo Transform Coding," by J. D. Johnson and A. J. Ferreira, Proc. IEEE Int. Conf. ASSP, pp. II-569–II-372, April 1992, "Signal Compression Based on Models of Human Perception," by N. Jayant, J. Johnston and R. Safranek, Proc. IEEE, Vol. 81, No. 10, October 1993, U.S. Pat. No. 5,285,498 to J. D. Johnston, U.S. Pat. No. 5,040,217 to K. Brandenburg and J. D. Johnston and U.S. Pat. No. 5,341,457 to J. L. Hall II and J. D. Johnston.

The aforementioned PAC coders can achieve excellent quality reproduction in an audio system, for example, with a coding rate of between 128–160 KB/s for stereo. However, there is a need to further reduce such bit rate requirements, while still achieving the same quality. The eventual goal is to, for example, achieve excellent quality on a wide range of analog material at a bit rate of much less than 128 Kb/s for a stereo pair.

The instant invention achieves this goal.

SUMMARY OF THE INVENTION

The instant invention is directed to an audio signal coding technique in which a time varying non-uniform filterbank is used in conjunction with a Perceptual Audio Coder.

2

The time varying, non-uniform filterbank is constructed from a set of uniform filterbank sections using aliasing cancellation principles. For each uniform section, a different resolution switchable uniform filterbank is used at the filter outputs.

Each uniform filterbank section covers a portion of a predetermined frequency axis and a transition filter is utilized to cover the remainder of the predetermined frequency axis. Aliasing terms introduced at the band edges of the transition filter are cancelled to obtain an overall transfer function which has linear phase and is approximately flat.

The invention advantageously provides a Perceptual Audio Coder, which utilizes a time-varying non-uniform filterbank that is approximately uniform in its highest frequency resolution mode, and is close to a critical band system in its highest temporal resolution mode. The result is a PAC coder with excellent quality reproduction in an audio system with a coding rate of substantially less than 128 KB/S for stereo.

DETAILED DESCRIPTION OF THE INVENTION

Figure 1:
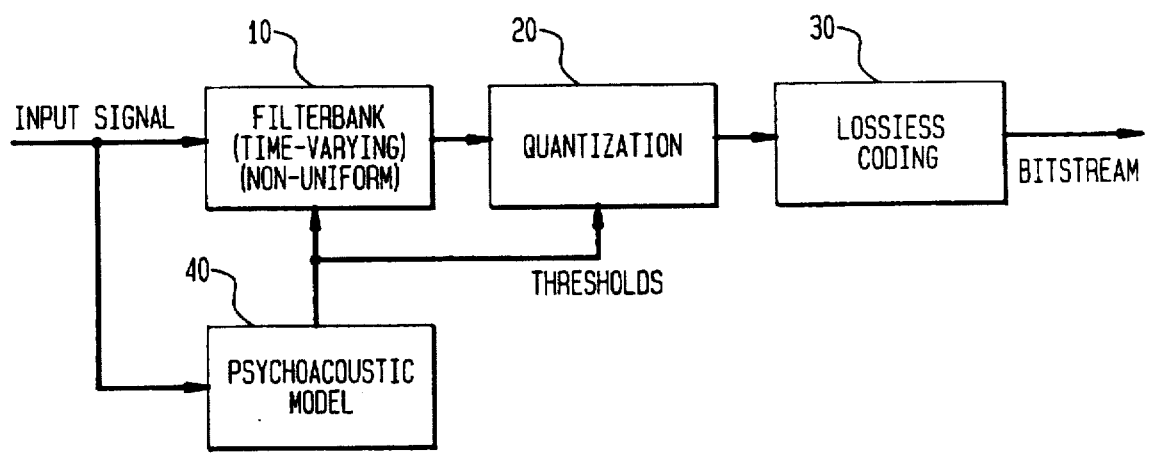
FIG. 1 illustrates an audio coding system paradigm in accordance with the instant invention.

All current high quality audio compression algorithms are based around the system paradigm shown in FIG. 1. Compression is achieved on the digital/audio input signal by means of a filterbank 10, quantization block 20 and a lossless coding block 30. The quantization block 20 would typically use PCM quantization, which is well known in the art, and will not be further described herein. The lossless coding block 30 would typically use a Huffman coding technique, which is also well known in the art and will not be further described herein. Similarly, psycho acoustic modelling techniques, such as take place in block 40, are also well known and are described, for example, in "Transform Coding of Audio Signals Using Perceptual Noise Criteria," by I. D. Johnston, "IEEE Journal on Selected Areas in Communication," Vol. 6, pp. 319–323, February 1988.

The block diagram shown in FIG. 1 is essentially described in U.S. Pat. No. 5,285,498 (FIG. 2 of the '498 Patent), which has been incorporated herein by reference, as if fully set forth herein, except for the operation of time varying non-uniform filterbank 10. It is the characteristics of filterbank 10, in combination with the remaining components shown in FIG. 1, which provide the advantages of the instant invention. The input signal to the filterbank shown in FIG. 1 is a digital/audio signal, which is an audio signal that has been subjected to preprocessing in the form of a PCM coding, which is the function of a preprocessor such as preprocessor 120 shown in FIG. 1 of the '498 patent.

A coder such as shown in FIG. 1, makes use of sophisticated psychoacoustic models, which determine the distribution of bits and hence noise in time and frequency in an attempt to minimize perceptual distortion.

For clarity of explanation, the illustrative embodiment of the present invention is presented as comprising individual functional blocks. The functions these blocks represent may be provided through the use of either shared or dedicated hardware, including, but not limited to, hardware capable of executing software. Illustrative embodiments may comprise digital signal processor (DSP) hardware, such as the AT&T DSP16 or DSP32C, and software performing the operations are discussed below. Very large scale integration (VLSI) hardware embodiments of the present invention, as well as hybrid DSP/VLSI embodiments, may also be provided.

Such published psychoacoustic models, as set forth above, make use of the short-term signal energy distribution as a function of frequency. From this energy distribution, and the tone-like or noise-like characteristics of the signal as a function of frequency, it is known that a set of thresholds, representing the just noticeable noise levels, can be calculated. Assuming that the introduced quantization noise is below these levels, signal coding will be transparent. In practice, the models are not perfect. Nevertheless, they offer a significant improvement in over subband coders which assign quantization noise (or bits) based on minimum sum squared error.

The time-frequency (TF) resolution of the psychoacoustic analysis should match the TF resolution of the auditory system, which is known to be largely determined by the behavior of the basilar membrane. These resolution characteristics are reflected in the critical band scale, which indicates that the frequency resolution in the psychoacoustic model should vary from 100 Hz at low frequencies, to around 4 Khz at high frequencies (i.e., a 40:1 change in resolution). This suggests that the temporal resolution in the PAC coder should increase by a factor of about 40:1 from low to high frequencies.

It is known that most psychoacoustic models use a very low uniform temporal resolution. A lack of temporal resolution at high frequencies has little effect on the thresholds calculated for stationary signals. However, the thresholds calculated for dynamic signals will be inaccurate, and could lead to audible distortions. This behavior can be corrected by using a time varying, non-uniform filterbank to calculate energy distributions, which is the object of this invention.

Many audio signals contain rapid increases in energy based upon, e.g., sounds emanating from castanets and triangles. These rapid increase in energy are referred to as "attacks." Typically, such attacks are difficult to encode and reproduce accurately, such that attacks will not sound distorted. As an example, we can take an attack from a castanet and the relatively stationary signal from a piccolo. Using a filterbank with low temporal resolution on a signal like castanets, generates a huge bitrate demand around the attack, because of the need to make sure the threshold requirements before and after the attack are met. In contrast, filterbanks with low temporal resolution can be used to code piccolo without any penalty because the thresholds are relatively stationary.

Threshold maps for attacks from a castanets or piccolo may seem to suggest that a critical bandlike filterbank is optimum for coding, since such a filterbank will naturally meet the psychoacoustic threshold constraints without introducing high bitrate demand. However, it has been found that this is not correct. In fact, it has been determined that for a castanets attack and a piccolo attack, that there are potentially better filterbanks. For piccolo, since thresholds are relatively constant, it is possible to use a filterbank with a very high frequency resolution (and hence low temporal resolution) without paying any penalty to meet the psychoacoustic thresholds. Such a filterbank will always be better than a critical band system, since it will have much higher coding gain. Analogously, for the castanets signal, the threshold is relatively constant across a band of upper frequencies, and it is possible to use a higher temporal resolution filterbank (which has low frequency resolution) without paying any penalty, and the filterbank will always have higher coding gain than a critical band system for this signal. Based on this analysis, it is apparent that there is no optimum filterbank resolution, but rather for any particular signal the optimum decomposition depends primarily on the TF energy distribution, and on the signal characteristics as determined by the psychoacoustic analysis.

In order to design a filterbank with the foregoing characteristics, we must have a finite set of resolutions which cover the range of signal possibilities, and some method of mapping the psychoacoustic thresholds onto quantization step-sizes for the coder filterbank. One particular approach is the structure shown in FIG. 2, which plots signal magnitude vs. normalized frequency.

Figure 2:
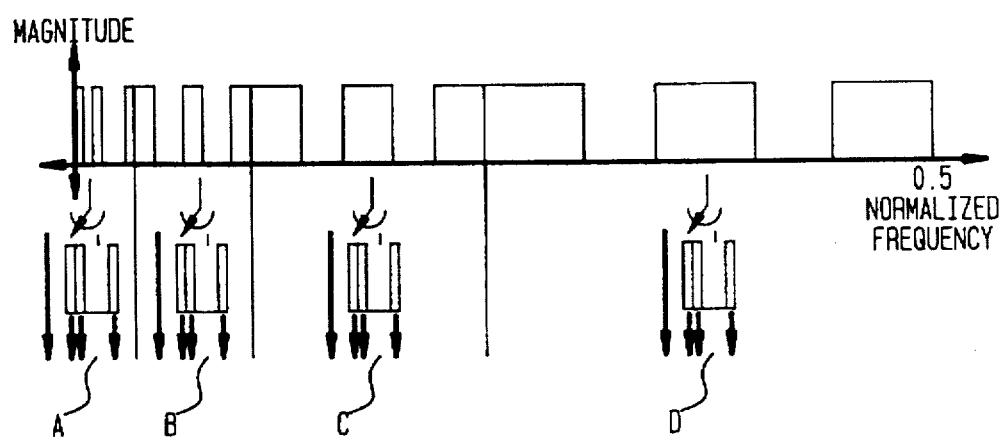
FIG. 2 illustrates a switched filterbank for use with one embodiment of the invention.

The basic design consists of a non-uniform filterbank cascaded with time-varying cosine modulate uniform filterbanks. The non-uniform filterbank is constructed from a set of uniform sections using aliasing cancellation principles. For each uniform section, a different resolution switchable uniform filterbank is used at the filter outputs. The end result is that in its highest frequency resolution mode the filterbank is approximately uniform, while in its highest temporal resolution mode, it is close to a critical band system. In the example of FIG. 2, four uniform sections (a–d) make up the non-uniform filterbank and, although it would be possible to allow each of the cascaded filters to vary with time independently, we vary each of the filters within a section together. So, in this example, there are eight different stationary resolutions for the complete system.

This particular structure allows a very natural adaption strategy. The non-uniform filterbank is used as a part of the coding system, and also to determine the psychoacoustic thresholds (though in calculating the thresholds, it is oversampled, while for coding only critical sampling is used). The psychoacoustic thresholds are used to drive the resolution selection process. If a particular section is in high resolution mode, the cascaded filterbank basis functions cover a region of thresholds calculated using the non-uniform filterbank. The minimum threshold over the region is used to ensure transparent coding. Once the thresholds are known, it is possible to calculate the Perceptual Entropy (PE) for each filterbank resolution, and the resolution which minimizes PE is chosen. The PE is well correlated with bitrate and, therefore, this adaption strategy minimizes the bitrate required for transparent coding.

As set forth above, psychoacoustic modeling techniques are well know. However, due to the fact that filterbank 10 is time varying and non-uniform, psychoacoustic model 40 would be slightly modified from the design used with a uniform filterbank. Such modifications, however, would be apparent to one skilled in the art, and the manner of making such modifications are described, for example, in "Psychoacoustics, Facts and Models," by Zwicker and Fastl, Springer Verlag, 1990, the teachings of which are incorporated herein by reference as if fully set forth herein.

In order to describe the design of time varying non-uniform filterbank 10, it is necessary to consider the Pseudo QMF approach. The principles of PQMF design are well established and, thus, no further description is necessary. See for example, P. O. Vaidyanathan, "Multirate Systems and Filterbanks," Englewood Cliffs, N.J., Prentice Hall, 1992. J.

H. Rothweiler, "Polyphase Quadrature Filters—A New Subband Coding Technique," in Proc IEEE Int. Conf. ASSP (Boston, Mass.), pp. 1280–1283, April 1983, P. O. Chu, "Quadrature Mirror Filter Design for an Arbitrary Number of Equal Bandwidth Channels," IEEE Trans. Acoust., Speech, Signal Proc., Vol. 34 pp. 203–218, February 1985. The teachings of the foregoing references are incorporated herein by reference as if fully disclosed herein. It is valuable, however, to review the basic principles and some properties of the solutions, since these are useful in the filter design which follows.

A PQMF filterbank is a uniform M, band system in which the channel filters are derived from a single real length L lowpass (LP) prototype $g(n)$, which is usually linear phase by modulation, i.e., $$h_i(n) = a_i g(n) e^{-j\frac{\pi}{M}(i+0.5)}\left(n - \frac{(L-1)}{2},\right) +$$

$$a^*_i g(n) e^{j\frac{\pi}{M}(i+0.5)}\left(n - \frac{L-1}{2}\right), \quad i = 0 \ldots M-1,$$

where superscript * denotes complex conjugation.

Since the LP prototype has real coefficients, this leads to channel filters which are obtained by cosine modulation. The complex multiplying factors $a_i$ define the modulation phase ($|a_i|=1$ is assumed). The synthesis filters are defined in exactly the same manner with a different modulation phase which is usually chosen so that the resulting filters are the time-reverse of the analysis filters.

The basic PQMF result shows that if the stopband of the LP prototypes begin before $$\pm \frac{\pi}{M},$$

Near Perfect Reconstruction (NPR) designs are possible, since the modulation phase can be chosen so that aliasing terms introduced at the upper and lower band edges will cancel with the co-located aliasing terms introduced in the adjacent bands. This cancellation property does not depend on the choice of the Low Pass (LP) prototype (though it must have real coefficients). In addition to Aliasing Cancellation (AC), NPR requires an overall response which is flat and has linear phase. By choosing the syntheses filters as the time-reverse of the analysis filters, the overall filter bank response has linear phase. Approximately flat magnitude response can be obtained by an appropriate design for the LP prototype.

Some PQMF designs have many advantages over more general M band PR or NPR designs. Since they have a modulated structure, it is possible to develop implementations based on fast cosine transforms. Their design is also relatively straightforward because a single LP prototype specifies all M analysis and synthesis filters. These advantages apply to PR modulated designs as well. In addition to this, the NPR PQMF designs are applicable for large numbers of channels that can be derived directly from designs for small numbers of channels by interpolation (also called scaling) of the LP prototype. This is because good reconstruction properties depend only on the transition band shape and the level of the stopband. So, given a prototype $G(z)$, which is a good design for M channels, the prototype $F(z)G(z^K)$ will be a good design for ICM channels if $F(z)$ is a linear phase lowpass filter which is flat over the range O to $\pi/Mk$ and has a high stopband attenuation from $2\pi/K - \pi/Mk$ to $\pi^1$.

We now turn to the specific design of filterbank 10.

Figure 3:
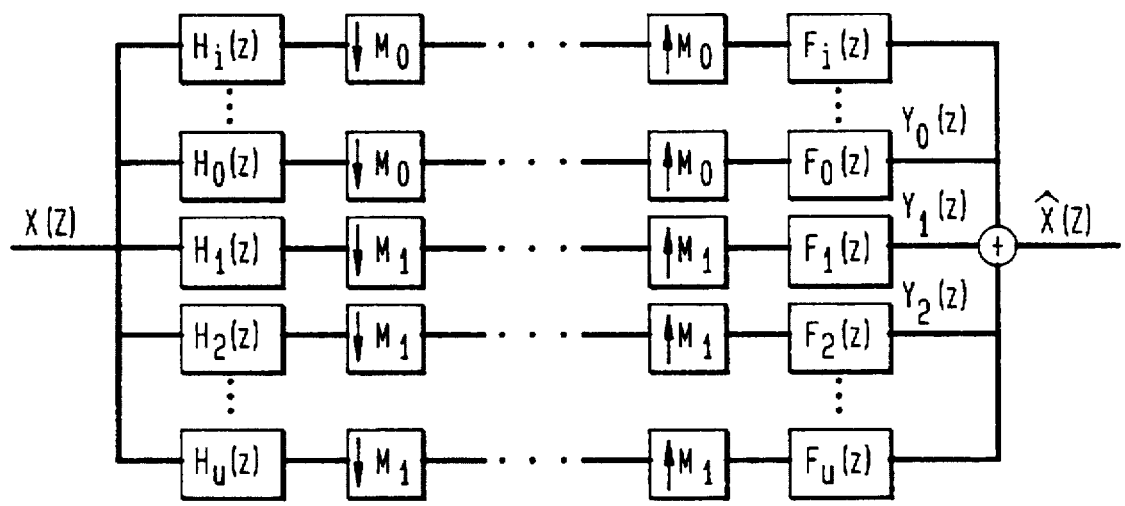
FIG. 3 illustrates the use of concatenating uniform filterbank sections to form a non-uniform filterbank.
Figure 4:
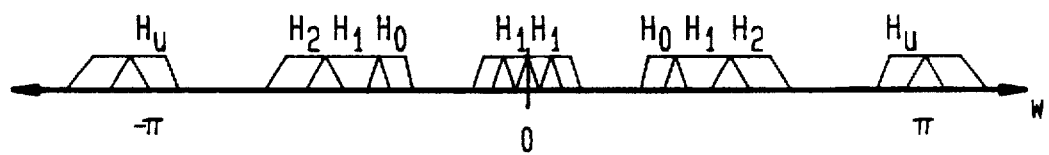
FIG. 4 illustrates an analysis filter magnitude response for the filterbank shown in FIG. 3.

Consider the critically sampled, modulated filterbank arrangement shown in FIGS. 3 and 4. It consists of two uniformly spaced filterbank sections ($H_i \ldots H_o \ldots$ and $H_2 \ldots H_u \ldots$), which each cover a portion of the frequency axis and a transition filter ($H_1$), which covers the remainder of the frequency axis. If we assume that the uniform channels at either side of the transition filter have been designed for AC in accordance with the PQMF technique discussed above, the majority of the aliasing terms will be cancelled. The problem is to cancel the remaining aliasing terms introduced at the band edges of the transition filter, and to obtain an overall transfer function which has linear phase and is approximately flat.

The instant invention demonstrates that cancellation of the alias terms and NPR is possible with such a channel arrangement, and that the transition filter can be a modulated filter. The aliasing distortion remaining after reconstruction is determined by the stopbands of the analysis and synthesis filters. This distortion can be made arbitrarily small by using appropriately designed filters. Firstly, given a transition filter prototype which 'joins' a uniform section with channel spacing $\pi/M_o$ to a uniform section with channel spacing $\pi/M_1$, a prototype which joins a uniform section with spacing $\pi/K\ M_o$ to a uniform section with spacing $\pi/KM_1$ can be generated by sealing (interpolation by K). Secondly, transition filters are modulated filters, and so the same lowpass prototype can be used to generate a transition filter for a range of different center frequencies. Finally, the transition filter prototype which is used to make the transition from spacing $\pi/M_o$ to $\pi/M_1$ can also be used to make the transition from spacing $\pi/M$, to $\pi\ M_o$ by taking its complex conjugate before modulation.

To derive the AC conditions we consider again the arrangement show in FIGS. 3 and 4, and develop the expressions for aliasing distortion introduced at the band edges of the transition filter, and the two surrounding channels. The analysis filter for channel i is generated by modulation of a (possibly complex) length L, lowpass prototype $gi(n)$ as follows:

$$h_i(n) = a_i g_i(n) e^{j\frac{\pi}{M_i}(k_i+0.5)}\left(n - \frac{(L_i - 1)}{2}\right) +$$

$$a^*_i g^*_i(n) e^{j\frac{\pi}{M_i}(k_i+0.5)}\left(n - \frac{L_i - 1}{2}\right)$$

and the syntheses filters are given by:

$$f_i(n) = b_i g_i(n) e^{j\frac{\pi}{M_i}(k_i+0.5)}\left(n - \frac{(L_i - 1)}{2}\right) +$$

$$b^*_i g^*_i(n) e^{j\frac{\pi}{M_i}(k_i+0.5)}\left(n - \frac{L_i - 1}{2}\right)$$

The channel i center frequency is given by $$\pm \pi \frac{(k_i + 0.5)}{M},$$

$K_i$ is an integer and $M_i$ is the decimation factor. This ensures that all channels satisfy the integer band sampling constraint. The coefficients $a_i$, $b_i$ are complex and define the modulation phase (we assume $|a_i|=|b_i|=1$). It is by appropriate choice of these parameters and design of the magnitude response of the transition filter that AC is possible. In the following development, $i=1$ denotes the transition filter and $i=0$ and $i=2$ denote the filters at either side.

The lowpass prototypes for the uniform sections are real, and the complex modulation reduces to cosine modulation. The transition filter lowpass prototype must have complex coefficients since it will have a different transition band shape either side of the center frequency to meet the AC conditions which are developed. Note that the modulated transition filter still has real coefficients.

In the development $M_1<M_o$ is assumed. That is, the transition is from narrow channels at low frequencies to wider channels at high frequencies. The opposite case $(M_o>M_1)$ can be easily found from the results presented. Note that the decimation factor of the transition filter is chosen to be the same as that of the wider of the two uniform sections ($M_1$ in this case). Choosing it to be less than this would lead to constraints on the transition band size of the wider filter bank section.

Following PQMF principles, the response of all analysis and syntheses filters overlap only with adjacent channels, and the magnitude response is to be zero below (above) the center frequency of the adjacent lower (upper) channel. Both the analysis and synthesis filters have positive and negative frequency components, as shown in FIG. 3. These components will not overlap except when $k_i$ is 0 or $M_1-1$. In the case of transition filter aliasing components, these cases can be ignored since a transition filter will generally not be used around 0 or $\pi$.

The transition filter alias components will be cancelled if $M_o k_1 = M_1(k_0+1)$, $k_2 = k_1+1$ and the following two conditions are met:

$$\frac{1}{M_0} a_0 b^*_0 G^*_0(zW_{2M_0}^{-(k_0+0.5)})G_0(zW_{2M_0}^{-(k_0+1.5)}) +$$

$$\frac{1}{M_1} a_1 b^*_1 G^*_1(zW_{2M_1}^{-(k_1+0.5)})G_1(zW_{2M_1}^{-(k_1-0.5)}) = 0$$

and $$a_2 b^*_2 G^*_2(zW_{2M_1}^{-(k_1+1.5)})G_2(zW_{2M_1}^{-(k_1+0.5)}) +$$

$$a_1 b^*_1 G_1 * (zW_{2M_1}^{-(k_1+0.5)})G_1(zW_{2M_1}^{-(k_1+1.5)}) = 0$$

where a superscript * in $G^*$ (z) denotes complex conjugation of the coefficients.

The condition $M_o k_1 = M_1 (k_o+1)$, $k_2 = k_1+1$, which must, of course, be met with $0 \leq k_0 \leq M_o$ and $0<K_1<M_1$ with all factors integer, place restrictions on the channel arrangements which are possible. This restriction comes directly from the integer band constraints. Note, in particular, that if $M_o$ and $M_1$ are coprime, it is not possible to find a $k_o$ and $k_1$ to satisfy this constraint.

The constants $a_i$, $b_i$, in equations (4) and (5) must be chosen such that:

$$\frac{a_1 b^*_1}{a_0 b^*_0} = -0$$

and $$\frac{a_2 b^*_2}{a_1 b^*_1} = -1$$

for aliasing to be cancelled.

We now consider the design procedure for filterbank 10.

Above, it has been established that NPR with the non-uniform arrangement shown in FIG. 3 is possible if a complex modulated transition filter is used, and the modulation phase and the magnitude response of the transition filter satisfy certain constraints. Below, one possible design procedure is outlined. The actual response of the various filterbank 10 sections is shown in FIG. 4.

The assumption is that the LP prototypes for two uniform filter bank sections have already been designed, and the goal is to find a transition filter which will fill the gap between these sections. The most direct approach to this problem is to design a transition filter by minimizing some function of the reconstruction error. The stopband of a transition filter designed in this way will automatically be good, since any stopband energy leaking into nonadjacent bands will effect the flatness of the total magnitude response and the total reconstruction error. This reconstruction error can be expressed directly in terms of the impulse responses of the channels using a time domain formulation. Infinite matrices provide a particularly convenient notation.

Since the synthesis impulse responses are the time-reverse of the analysis filter impulse responses, the complete reconstructed signal can be written in the form $$\hat{x} = A^T.A.x$$

where x is an infinite vector representing the input sequence $x = |\ldots x(-1)x(0)x(1) \ldots |^T$ and $\hat{x}$ is the reconstructed sequence. Superscript T denotes transpose. The matrix A contains time-reversed and shifted versions of the impulse responses of the analysis filters and it has a block Toeplitz structure.

$$A = \begin{bmatrix} \ldots & \ldots & \ldots & \ldots & \ldots & \ldots & \ldots & \ldots & \ldots & \ldots & \ldots \\ \ldots & 0 & A_o & A_1 & \ldots & \ldots & A_{k-1} & 0 & 0 & 0 & \ldots \\ \ldots & 0 & 0 & A_o & A_1 & \ldots & \ldots & A_{k-1} & 0 & 0 & \ldots \\ \ldots & 0 & 0 & 0 & A_o & A_1 & \ldots & \ldots & A_{k-1} & 0 & \ldots \\ \ldots & \ldots & \ldots & \ldots & \ldots & \ldots & \ldots & \ldots & \ldots & \ldots & \ldots \end{bmatrix}$$

where each $A_k$ is an M×M matrix. In the case of uniform filter banks, the matrix $|A_o \ldots A_{k-1}|$ defining M rows of A will consist of the M analysis filter impulse responses, time-reversed. For a non-uniform filter bank, with integer decimeters, M is any common multiple of the decimation factors, $M_i$, (the least common multiple is the logical choice). In this case, for every M rows of A, each analysis filter impulse response is used $M/M_i$ times, smiled by $M_i$. Given this structure for A, the total system response also has a block Toeplitz structure.

$$A^T \cdot A = \begin{bmatrix} \ldots & \ldots & \ldots & \ldots & \ldots & \ldots & \ldots & \ldots & \ldots & \ldots & \ldots \\ \ldots & 0 & S_{-k+1} & \ldots & S_o & \ldots & S_{k-1} & 0 & 0 & 0 & \ldots \\ \ldots & 0 & 0 & S_{-k+1} & \ldots & S_o & \ldots & S_{k-1} & 0 & 0 & \ldots \\ \ldots & 0 & 0 & 0 & S_{-k+1} & \ldots & S_o & \ldots & S_{k-1} & 0 & \ldots \\ \ldots & \ldots & \ldots & \ldots & \ldots & \ldots & \ldots & \ldots & \ldots & \ldots & \ldots \end{bmatrix}$$

and the elements of a single row can be written as:

$$S_k = \sum_{i=0}^{K-1-k} A_i^T A_{i+k}, k = 0 \ldots K-1$$

where $S_{-k}=S_k^T$. The reconstruction conditions are then:

$$S_k = \delta(k) I_m, k = -K+1 \ldots K-1$$

where $I_m$ is the M×M identity matrix, and $\delta(k)$ is the Kronecker delta function.

These results can be used to find the modulated transition filter by forming a quadratic error measure based on $S_k$ $$E = \sum_{k=-(K-1)}^{K-1} \sum_{i,j} (S_k(i,j) - \delta(k) I_M(i,j))^2$$

where $S(i,j)$ denotes the element $(i,j)$ of the matrix S. If the system is perfectly reconstructing, E will be zero. By constructing most of A using the known coefficients for the uniform filters, and using the complex LP transition filter, coefficients as free variables, which define the remaining basis functions, this error measure can be used in any unconstrained optimization procedure to find the optimum transition LP prototype filter.

Optimization of the error criteria can be achieved by use of the Brayden-Fletcher-Goldfarb-Shanno (BFGS) algorithm. See, for example, "The State of the Art in Numerical Designs," by A. H. Jacobs, ed 1977, London Academic Press, Chap. III.1, paragraphs 3–6 by K. W. Brodoe, the teachings of which are incorporated herein by reference as if fully disclosed herein.

A specific example of a design for filterbank 10 is a 28 band design, which approximate the critical bands of the ear. This design was developed from two prototypes using scaling and modulation. The filter lengths ranged from 3342 for the low frequency bands, and 96 for the high frequency bands. Aliasing distortion was designed with a peak of about −85 db, and with a passband derivation of approximately ±1×10⁻³.

The non-uniform filterbank of the instant invention has a frequency resolution which is similar to a critical band system at low frequencies, and slightly higher resolution at high frequencies. This is coupled with the time-varying systems which lead to a highest resolution of 256 (approximately) uniform bands over the complete frequency range.

The system has been tested on the complete set of signals from the ISO test set. The codec is monophonic, so only the right channel from each signal was used in the tests. The quality over a range of fixed bit rates from 48 kb/s to 64 kb/s was evaluated informally by headphone listening. Results show that the system provides excellent quality on all signals. However, at the extreme lower rate of 48 Kb/s, audible distortions were apparent on almost all signals. These distortions are apparently due to the lack of coding gain in the case of both very stationary signals and very dynamic signals.

The foregoing disclosure and description of the invention is illustrative and explanatory thereof, and various changes may be made within the scope of the appended claims without departing from the spirit of the invention.

What is claimed is:

1. A method of digitally encoding a digital/audio input signal to generate a compressed digital bit stream comprising the steps of:

calculating a plurality of threshold noise levels in response to time frequency characteristics of the digital audio input signal, selectively filtering said digital/audio input signal in a time varying non-uniform filterbank to generate a filtered signal, said time varying form filter bank having a plurality of uniformly spaced filterbank sections covering a portion of a predetermined frequency axis and a transition filter being selected to cover a remaining portion of said predetermined frequency axis, said selective filtering step being responsive to said calculated threshold noise levels, quantizing said filtered signal to generate a quantized signal, said quantizing step being responsive to said threshold noise levels, and encoding said quantized signal to generate said compressed digital bit stream.

2. A method in accordance with claim 1, wherein there is further included the steps of:

determining a quadratic error measure for said transition filter, and optimizing said quadratic error measure so that said error measure is minimized.

3. A method in accordance with claims 2, wherein there is further included the step of canceling aliasing terms introduced at the band edges of said transition filter, whereby an overall transfer function for said non-uniform time varying filterbank is obtained, which has linear phase and is approximately flat.

4. A method in accordance with claim 3, wherein said transition filter is a modulated filter.

5. A method of digitally encoding a digital/audio input signal to generate a compressed digital bit stream comprising the steps of:

calculating a plurality of threshold noise levels in response to time-frequency characteristics of the digital/audio input signal, dividing said digital/audio input signal into a plurality of frequency sub-bands by inputting said digital/audio signal into a time varying non-uniform filterbank comprised of a plurality of uniformly spaced filterbank sections with a selectively added transition filter, generating one or more digital samples for each of said plurality of frequency subbands, the number of digital samples generated being responsive to selected ones of the plurality of frequency sub-bands, quantizing said digital samples to generate a quantized digital signal, said dividing, generating and quantizing steps being responsive to said threshold noise levels, and encoding said quantized digital signal to generate said compressed digital bit stream.

6. A method of digital encoding in accordance with claim 5, wherein the number of digital samples generated is greater when the frequency of the selected frequency sub-band is higher.

* * * * *